United States Patent
Sun et al.

(10) Patent No.: US 9,232,207 B2
(45) Date of Patent: Jan. 5, 2016

(54) 3D VIDEO CONVERSION SYSTEM AND METHOD, KEY FRAME SELECTION METHOD AND APPARATUS THEREOF

(71) Applicant: Hisense Co. LTd., Qingdao, Shandong (CN)

(72) Inventors: Jiande Sun, Shandong (CN); Jiangchuan Xie, Shandong (CN); Ju Liu, Shandong (CN); Wei Liu, Shandong (CN)

(73) Assignee: HISENSE CO., LTD., Laoshan District, Qingdao, Shandong (CN)

( * ) Notice: Subject to any disclaimer, the term of this patent is extended or adjusted under 35 U.S.C. 154(b) by 471 days.

(21) Appl. No.: 13/713,934

(22) Filed: Dec. 13, 2012

(65) Prior Publication Data
US 2014/0071230 A1 Mar. 13, 2014

(30) Foreign Application Priority Data
Sep. 10, 2012 (CN) .......................... 2012 1 0332711

(51) Int. Cl.
*H04N 13/00* (2006.01)
*H04N 13/02* (2006.01)

(52) U.S. Cl.
CPC ............. *H04N 13/00* (2013.01); *H04N 13/026* (2013.01)

(58) Field of Classification Search
CPC .............................. H04N 13/00; H04N 13/026
See application file for complete search history.

(56) References Cited

U.S. PATENT DOCUMENTS

2007/0268966 A1* 11/2007 Kim .................... 375/240.08

OTHER PUBLICATIONS

Optical Engineering vol. 47, issue 5, May 9, 2008, pp. 1-12.*

* cited by examiner

*Primary Examiner* — Huy T Nguyen
(74) *Attorney, Agent, or Firm* — Brinks Gilson & Lione

(57) ABSTRACT

The present application discloses a Three Dimensions (3D) video conversion system and method, and a key frame selection method and apparatus thereof. The key frame selection method includes: after the ith key frame is determined, calculating feature matching ratios of video frames after the ith key frame in a 2D video; selecting video frames each of which has a feature matching ratio within the range of $T_1 \sim T_2$ as candidate key frames; selecting a video frame from the candidate key frames as the (i+1)th key frame according to re-projection errors of the candidate key frames. Since key frames are selected according to the feature matching ratios of video frames to the previous key frame, and the later key frame is selected according to the re-projection errors of the candidate key frames. Thus the selection for key frames is more reasonable, and the 2D to 3D video conversion based on more reasonable key frames may improve converted 3D video quality.

18 Claims, 10 Drawing Sheets

3D VIDEO CONVERSION SYSTEM AND METHOD, KEY FRAME SELECTION METHOD AND APPARATUS THEREOF

RELATED APPLICATIONS

The application claims priority to Chinese Patent Application No. 201210332711.X, titled as "3D Video Conversion System and Method, Key Frame Selection Method and Apparatus thereof" filed on Sep. 10, 2012, which is herein incorporated in its entirety by reference.

FIELD OF THE INVENTION

The present application relates to video technologies, and more particularly, to a three Dimensions (3D) video conversion system and method, and a key frame selection method and apparatus thereof.

BACKGROUND OF THE INVENTION

As people's aesthetic requirements are increasing, 3D video has become popular because it makes people feel like on the scene. It is very expensive to directly make a 3D video. Thus, the popularization and development of the 3D video is hindered. At present, two Dimensions (2D) videos having been made are countless, and many of which are important fragments and will never appear again. Therefore the conversion from a 2D video to a 3D video is of positive practical significance, and thus becomes the research focus.

In general, the techniques for 2D to 3D video conversion may include full-automatic conversion, semi-automatic conversion and manual conversion technique. The 3D videos obtained according to the full-automatic conversion technique have poor qualities due to the absence of artificial participation. The semi-automatic conversion technique can better balance artificial participation and stereoscopic effect, and which generally includes the following processes.

In step S101, key frames are selected from a 2D video.

In step S102, depth assignation is performed on each key frame.

In step S103, depth transmission is implemented.

In step S104, a 3D video is synthesized with depth images obtained from the depth transmission.

The inventor of the present application finds that because in the existing 2D to 3D video conversion process key frames are selected at fixed intervals, selected key frames are usually not representative. The depth of a non-key frame is obtained from the depth transmission of a key frame, thus the selection of a key frame will affect the depth of a non-key frame, and then affect the quality of converted 3D video. 3D video obtained according to existing techniques do not have high quality. There is much room for improvement in aspects such as stereo perception and verisimilitude.

SUMMARY OF THE APPLICATION

Embodiments of the present application provide a 3D video conversion system and method, and a key frame selection method and apparatus thereof, which can improve the converted 3D video quality.

In one aspect of the present application, a key frame selection method in 3D video conversion is provided, the method includes:

determining the (i+1)th key frame based on the ith key frame after the first key frame is determined;

calculating feature matching ratios of video frames after the ith key frame in a 2D video; wherein, i is a natural number, a feature matching ratio $R_c^j$ of the jth video frame beginning from the ith key frame is obtained according to the following formula 1;

$$R_c^j = \frac{R_j}{R} \quad \text{(formula 1)}$$

wherein, j is a natural number, $R_j$ is the number of feature points which the jth video frame beginning from the ith key frame, R is the number of feature points of the ith key frame;

selecting one video frame from candidate key frames each of which has a feature matching ratio within the range of $T_1 \sim T_2$ as a key frame.

Wherein, selecting one video frame from candidate key frames each of which has a feature matching ratio within the range of $T_1 \sim T_2$ as a key frame comprises: selecting video frames each of which corresponds to a feature matching ratio within the range of $T_1 \sim T_2$ as candidate key frames; selecting one video frame from the candidate key frames according to re-projection errors of the candidate key frames as the (i+1)th key frame.

Wherein, the re-projection error R.E of a candidate key frame is calculated according to the following formula 2;

$$R.E = \frac{\sum_n d(P_k X_k^n, x_k^n)^2}{Num} \quad \text{(formula 2)}$$

in the formula 2, the candidate key frame is the kth video frame in the 2D video, $x_k^n$ is plane coordinates of the nth feature point in the kth video frame, $X_k^n$ is 3D spatial coordinates of the nth feature point in the kth video frame, $P_k$ is the projection matrix calculated with all feature points in the kth video frame, k is a natural number, Num is the number of feature points in the kth video frame, n is a natural number which is less than or equal to Num;

in the formula 2, $x_k^n$ is calculated according to the following formula 3;

$$X_k^n = (P_k^n)^{-1} x_k^n \quad \text{(formula 3)}$$

in the formula 3, $(P_k^n)^{-1}$ is the inverse matrix of the projection matrix $P_k^n$, and $P_k^n$ is calculated according to the following formula 4;

$$P_k^n = \text{Tsai}(x_k^n) \quad \text{(formula 4)}$$

in the formula 4, Tsai(•) denotes estimating the projection matrix of the plane coordinates within its brackets;

in the formula 2, $P_k$ is calculated according to the following formula 5;

$$P_k = \text{Tsai}(x_k^1, x_k^2, x_k^3, \ldots x_k^{Num-1}, x_k^{Num}) \quad \text{(formula 5)}$$

in the formula 5, Tsai(•) denotes estimating the projection matrix of the plane coordinates within its brackets;

and wherein selecting one video frame from the candidate key frames according to re-projection errors of the candidate key frames as the (i+1)th key frame comprises:

selecting a candidate key frame with the smallest re-projection error as the (i+1)th key frame.

Wherein, $T_1$ is configured according to the following formula 9;

$$T_1 = \overline{R_c} \times (a \times \overline{O_{ak}} + b) \quad \text{(formula 9)}$$

in the formula 9, a and b are preseted parameters;

and wherein $T_2$ is configured according to the following formula 10;

$$T_2 = \overline{R_c} \times (c \times \overline{O_{ak}} - d) \quad \text{(formula 10)}$$

in the formula 10, c and d are preseted parameters;

in the formulas 9 and 10, $\overline{R_c}$ is the average value of feature matching ratios of video frames after the first video frame in the 2D video, and $\overline{O_{ak}}$ is the average value of change rates of cumulative overlap areas of video frames in the 2D video.

Wherein, $\overline{R_c}$ is calculated according to the following formula 7;

$$\overline{R_c} = \frac{\sum_g R_c^g}{Num - 1} \quad \text{(formula 7)}$$

in the formula 7, Num is the total number of video frames in the 2D video, $R_c^g$ is the feature matching ratio of the gth video frame in the 2D video, $R_c^g$ is calculated according to the following formula 6;

$$R_c^g = \frac{R_g}{R_1} \quad \text{(formula 6)}$$

in the formula 6, $R_g$ is the number of feature points of the gth video frame in the 2D video, $R_1$ is the number of feature points of the first video frame in the 2D video; wherein, g is a natural number from 2 to Num.

Wherein, a cumulative overlap area of one video frame in the 2D video is obtained according to the following method:

the cumulative overlap area $O_a(g)$ of the gth video frame in the 2D video is calculated according to the following formula 8;

$$O_a(g) = \sum_{i=1}^{g} O_c(i) \quad \text{(formula 8)}$$

wherein, $O_c(g)$ is the overlap area between the gth video frame and the (g−1)th video frame in the 2D video, g is a natural number from 2 to Num.

Wherein calculating feature matching ratios of video frames after the ith key frame in a 2D video comprises: starting from the first video frame after the ith key frame, calculating feature matching ratios of video frames after the ith key frame in an ascending order, comparing each calculated feature matching ratio with $T_1$; after determining that a feature matching ratio is less than $T_1$, stop calculating feature matching ratios of video frames after the ith key frame.

Wherein determining the first key frame comprises: determining the first video frame as the first key frame.

Wherein, before determining the (i+1)th key frame based on the ith key frame, further comprising:

Selecting M−2 video frames from the 2D video as reference frames; wherein, M is the predetermined number of key frames; determining the first video frame in the 2D video as the first key frame;

for the tth video segment:

calculating $T_1^t$ and $T_2^t$ of the tth video segment; wherein, the tth video segment refers to a video segment between the tth key frame and the tth reference frame, t is a natural number;

taking the tth key frame as the ith key frame, and taking the $T_1^t$ and $T_2^t$ of the tth video segment as the $T_1$ and $T_2$ respectively;

and after determining the (i+1)th key frame based on the ith key frame, further comprising:

taking the (i+1)th key frame as the (t+1)th key frame.

Wherein, calculating $T_1^t$ and $T_2^t$ of the tth video segment comprises:

determining $T_1^t$ according to the following formula 11;

$$T_1^t = \overline{R_c^t} \times (a \times \overline{O_{ak}^t} + b) \quad \text{(formula 11)}$$

in the formula 11, a and b are preseted parameters;

determining $T_2^t$ according to the following formula 12;

$$T_2^t = \overline{R_c^t} \times (c \times \overline{O_{ak}^t} - d) \quad \text{(formula 12)}$$

in the formula 12, c and d are preseted parameters;

In the formulas 11 and 12, $\overline{R_c^t}$ is the average value of feature matching ratios of video frames after the first video frame in the tth video segment, $\overline{O_{ak}^t}$ is the average value of change rates of cumulative overlap areas of video frames in the tth video segment.

In another aspect of the present application, a 3D video conversion method is provided, the method includes:

selecting key frames from a 2D video according to above mentioned key frame selection method;

performing depth assignation on each selected key frame;

obtaining depth images of non-key frames according to depth images of key frames;

synthesizing a 3D video according to depth images of non-key frames and depth images of key frames.

In yet another aspect of the present application, an key frame selection apparatus for 3D video conversion is provided, the apparatus includes:

a feature matching ratio calculating unit, configured to calculate feature matching ratios of video frames after the ith key frame in a 2D video according to the ith key frame;

a candidate key frame selecting unit, configured to select video frames each of which has a feature matching ratio within the range of $T_1 \sim T_2$ as candidate key frames; wherein, values of $T_1$ and $T_2$ are preset, and $T_1 < T_2$;

a key frame selecting unit, configured to select one video frame from the candidate key frames selected by the candidate key frame selecting unit as a key frame.

Wherein, the key frame selecting unit is configured to select one video frame from the candidate key frames as the (i+1)th key frame according to re-projection errors of the candidate key frames;

wherein, i is a natural number, the feature matching ratio $R_c^j$ of the jth video frame beginning from the ith key frame is obtained according to the following formula 1;

$$R_c^j = \frac{R_j}{R} \quad \text{(formula 1)}$$

wherein, j is a natural number, $R_j$ is the number of feature points of the jth video frame beginning from the ith key frame, R is the number of feature points of the ith key frame.

Wherein, the key frame selecting unit is configured to select a candidate key frame with the smallest re-projection error as the (i+1)th key frame; and the key frame selecting unit comprises:

a re-projection error calculating sub-unit, configured to calculate a re-projection error of each candidate key frame;

a key frame determining sub-unit, configured to select a candidate key frame with the smallest re-projection error as the (i+1)th key frame according to calculated results of the re-projection error calculating sub-unit;

wherein, the re-projection error RE of each candidate key frame is obtained according to the following formula 2;

$$R.E = \frac{\sum_n d(P_k X_k^n, x_k^n)^2}{Num} \quad \text{(formula 2)}$$

in the formula 2, the candidate key frame is the kth video frame in the 2D video, $x_k^n$ is plane coordinates of the nth feature point in the kth video frame, $X_k^n$ is 3D spatial coordinates of the nth feature point in the kth video frame, $P_k$ is the projection matrix calculated with all feature points in the kth video frame, k is a natural number, Num is the number of feature points in the kth video frame, n is a natural number which is less than or equal to Num; d(•) denotes calculating the difference between elements within its brackets;

in the formula 2, $x_k^n$ is calculated according to the following formula 3;

$$X_k^n = (P_k^n)^{-1} x_k^n \quad \text{(formula 3)}$$

in the formula 3, $(P_k^n)^{-1}$ is the inverse matrix of the projection matrix $P_k^n$, and $P_k^n$ is calculated according to the following formula 4;

$$P_k^n = \text{Tsai}(x_k^n) \quad \text{(formula 4)}$$

in the formula 4, Tsai(•) denotes estimating the projection matrix of the plane coordinates within its brackets;

in the formula 2, $P_k$ is calculated according to the following formula 5;

$$P_k = \text{Tsai}(x_k^1, x_k^2, x_k^3, \ldots x_k^{Num-1}, x_k^{Num}) \quad \text{(formula 5)}$$

in the formula 5, Tsai(•) denotes estimating the projection matrix of the plane coordinates within its brackets.

The apparatus further comprising:

a threshold determining unit, configured to determine $T_1$ and $T_2$;

wherein, $T_1$ is determined according to the following formula 9;

$$T_1 = \overline{R_c} \times (a \times \overline{O_{ak}} + b) \quad \text{(formula 9)}$$

in the formula 9, a and b are preseted parameters; and wherein $T_2$ is configured according to the following formula 10;

$$T_2 = \overline{R_c} \times (c \times \overline{O_{ak}} - d) \quad \text{(formula 10)}$$

in the formula 10, c and d are preseted parameters;

in the formulas 9 and 10, $\overline{R_c}$ is the average value of feature matching ratios of video frames after the first video frame in the 2D video, and $\overline{O_{ak}}$ is the average value of change rates of cumulative overlap areas of video frames in the 2D video.

wherein $\overline{R_c}$ is calculated according to the following formula 7;

$$\overline{R_c} = \frac{\sum_g R_c^g}{Num - 1} \quad \text{(formula 7)}$$

in the formula 7, Num is the total number of video frames in the 2D video, $R_c^g$ is the feature matching ratio of the gth video frame in the 2D video, $R_c^g$ is calculated according to the following formula 6;

$$R_c^g = \frac{R_g}{R_1} \quad \text{(formula 6)}$$

in the formula 6, $R_g$ is the number of feature points of the gth video frame in the 2D video, $R_1$ is the number of feature points of the first video frame in the 2D video; wherein, g is a natural number from 2 to Num;

a cumulative overlap area of a video frame in the 2D video is obtained according to the following method:

the cumulative overlap area $O_a(g)$ of the gth video frame in the 2D video is calculated according to the following formula 8;

$$O_a(g) = \sum_{i=1}^{g} O_c(i) \quad \text{(formula 8)}$$

wherein, $O_c(g)$ is the overlap area between the gth video frame and the (g−1)th video frame in the 2D video.

Wherein, the feature matching ratio calculating unit is further configured to take the first video frame in the 2D video as the first key frame; and the key frame selecting unit is further configured to update i=i+1 after selecting out the (i+1)th key frame, and send updated value of i to the feature matching ratio calculating unit;

the feature matching ratio calculating unit continues to calculate feature matching ratios of video frames after the ith key frame in a 2D video according to the ith key frame after receiving the updated value of i sent by the key frame selecting unit.

The apparatus further comprising:

a reference frame setting unit, configured to select M−2 video frames from the 2D video as reference frames; wherein, M is a predetermined number of key frames; and determine the first video frame in the 2D video as the first key frame in the 2D video;

a video segment determining unit, configured to take the video segment between the tth key frame and the tth reference frame as the tth video segment; wherein, t is a natural number;

a video segment threshold determining unit, configured to calculate $T_1{}'$ and $T_2{}'$ of the tth video segment according to every video frame in the tth video segment, take $T_1{}'$ and $T_2{}'$ as $T_1$ and $T_2$ respectively, take the tth key frame as the ith key frame, and send $T_1$, $T_2$ and the ith key frame to the feature matching ratio calculating unit;

a controlling unit, configured to, after obtaining the (i+1)th key frame selected by the key frame selecting unit, take the (i+1)th key frame as the (t+1)th key frame; and after determining that t is less than M−1, update t=t+1, and sends the (t+1)th key frame and updated value of t to the video segment determining unit.

In yet another aspect of the present application, a system for 3D video conversion is provided, the system includes:

the key frame selection apparatus mentioned above, configured to select key frames from a 2D video;

a depth assignation apparatus, configured to perform depth assignation on each key frame selected by the key frame selection apparatus, and obtain a depth image of each key frame;

a depth transmission apparatus, configured to obtain depth images of non-key frames based on depth images of key frames; and a video synthesizing apparatus, configured to synthesize a 3D video according to the depth images of key frames and the depth images of non-key frames.

Embodiments of the present application also provide a terminal for implementing above mentioned method, the terminal includes:

In embodiments of the present application, candidate key frames are selected according to the feature matching ratios of video frames to the previous key frame, and the later key frame is selected according to the re-projection errors of the candidate key frames. Thus the selection for key frames is more reasonable, and the 2D to 3D video conversion based on more reasonable key frames may improve converted 3D video quality.

Furthermore, embodiments of the present application also provide a scheme for adjusting the feature matching ratio thresholds $T_1$ and $T_2$, thus it is possible to determine $T_1$ and $T_2$, and then determine key frames according to 3D video quality requirement. Consequently, a more flexible 3D video conversion method is provided, a technician can flexibly adjust $T_1$ and $T_2$ according to 3D video quality requirement.

In addition, embodiments of the present application also provide a scheme for determining key frames according to a predetermined key frame number, which provides more flexibility for a technician to perform the 3D video conversion. Before converting a 3D video, the technician may limit the number of key frames according to the workload in advance. The key frame selection method may guarantee that the final number of selected key frames conforms to the predetermined key frame number, and ensure the workload of the technician.

DETAILED DESCRIPTION OF THE APPLICATION

In order to make objectives, technical solutions and advantages of the present application clearer, embodiments of the present application will be described in detail hereinafter with reference to accompanying drawings. It should be noted that in the following description, numerous specific details are set forth in order to provide a through understanding of the present application. It will be readily apparent however, that the present application may be practiced without limitation to these specific details.

The "module", "system", and the like in the application may include computer-related entities, for example but are not limited to a hardware, a firmware, a combination of hardware and software, software, or software in execution. For instance, the module may be but not limited to: a process running in a processor, a processor, an object, an executable program, a thread in execution, a program and/or a computer. For instance, the application programs running on a calculating device and the calculating device may be modules. One or more modules may be located in one executing process and/or thread. One module may be located on one computer and/or located on two or more computers.

In embodiments of the present application, the inventor of the present application considers that it is possible to find key frames which lower the total depth transmission error from 2D video frames, and implement the depth transmission based on the key frames to obtain a 3D video with a high quality. Therefore, in the technical solution of embodiments of the present application, instead of selecting key frames at fixed intervals, the later key frame which has a proper feature matching ratio and a little re-projection error is selected based on the feature matching ratios of video frames to the previous key frame. By this way, the difference between the selected key frame and the non-key frame is relatively small. Accordingly, the error is small when the key frame is depth transmitted to the non-key frame, and the quality of converted 3D video is improved.

In embodiments of the present application, a key frame is determined based on a previous key frame, that is, the (i+1)th key frame is determined based on the ith key frame. Specifically, after determining the first key frame, the second key frame is determined based on the first key frame, the third key frame is determined based on the second key frame, the fourth key frame is determined based on the third key frame, . . . , and the like, then all of the key frames are determined.

Figure 1:
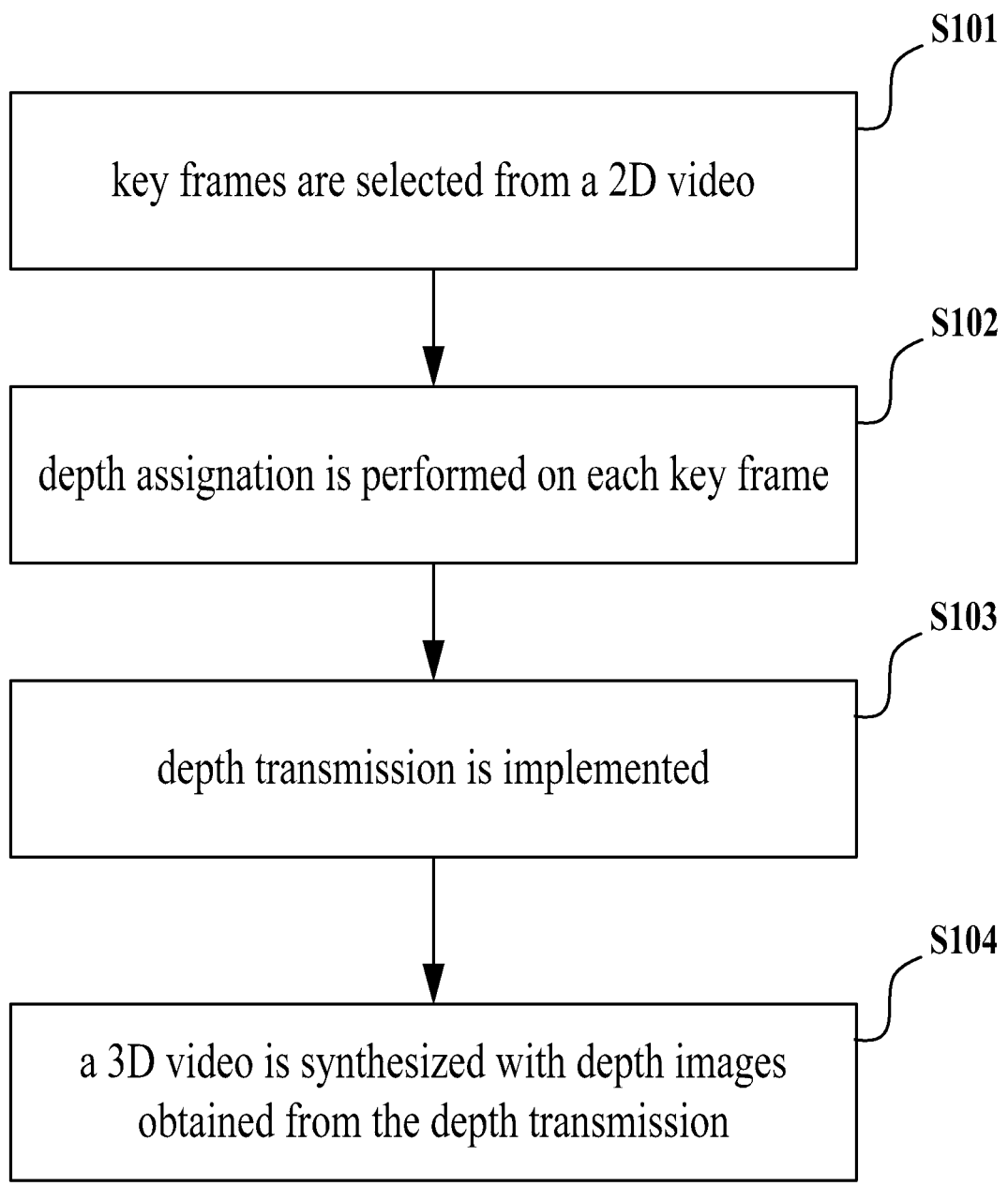
FIG. 1 is a flowchart illustrating a 3D video conversion method in the prior art.
Figure 2:
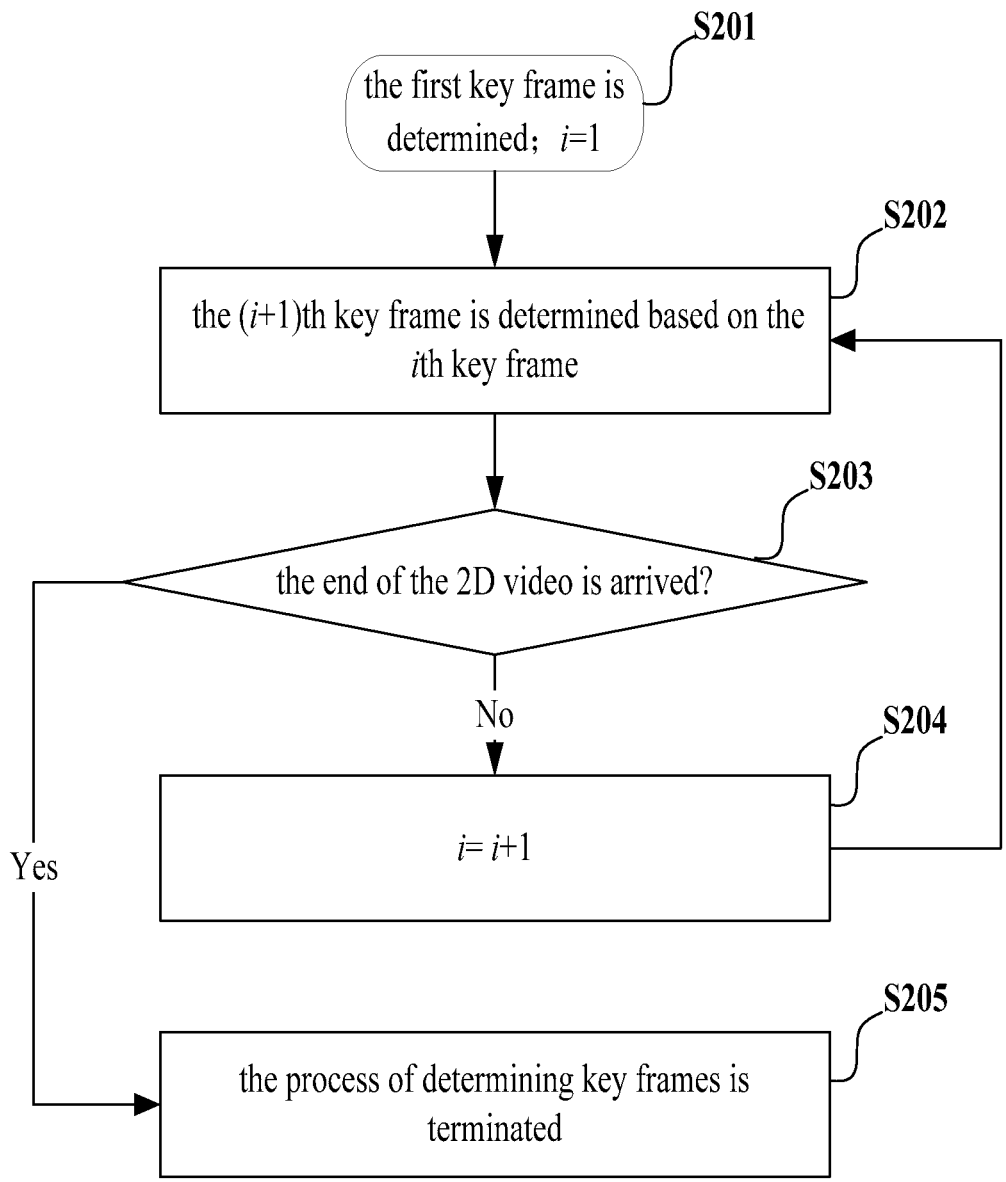
FIG. 2 is a flowchart illustrating a 3D video conversion method according to an embodiment of the present application.

FIG. 2 is a flowchart illustrating a method for selecting key frames in 3D video conversion according to an embodiment of the present application. As shown in FIG. 2, the method includes the following processes.

In step S201, the first key frame is determined; i=1.

The first key frame may be a video frame selected from a 2D video. For instance, it is possible to consider the first video frame in the 2D video as the first key frame, or other video frame in the 2D video as the first key frame.

In step S202, the (i+1)th key frame is determined based on the ith key frame.

In step S203, it is determined that whether the end of the 2D video is arrived, if the end of the 2D video is arrived, proceed to step S205 to terminate the process for determining key frames; otherwise, proceed to step S204.

In step S204, i=i+1, then return to step S202.

In step S205, the process of determining key frames is terminated.

Obviously, in the above cycle process generated by repeatedly executing steps S202-S204, i may be an integer from 1 to N−1, that is, i is a natural number in [1,N−1].

In above step S202, a simple method for determining the (i+1)th key frame based on the ith key frame may includes: calculating feature matching ratios of video frames behind the ith key frame to the ith key frame; selecting the video frame corresponding to the feature matching ratio which is the closest to $T_1$ as the ith key frame. Wherein, $T_1$ is preseted.

Figure 3:
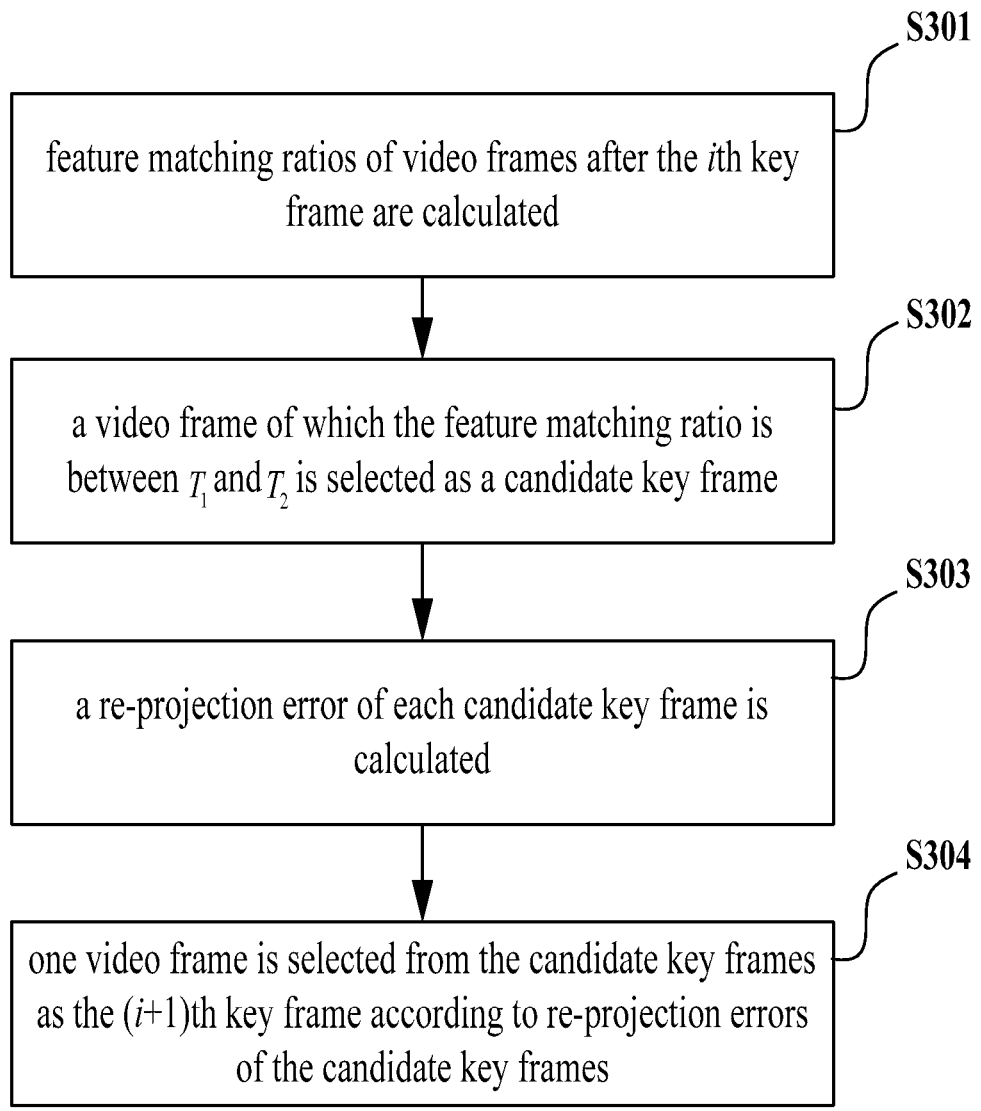
FIG. 3 is a flowchart illustrating a method for determining the (i+1)th key frame according to the ith key frame according to an embodiment of the present application.

Preferably, in the process of determining the (i+1)th key frame, it is possible to select multiple candidate key frames, and select a relatively proper video frame from the multiple candidate key frames as the (i+1)th key frame. In above step S202, the specific process for determining the (i+1)th key frame based on the ith key frame may refer to FIG. 3, which includes the following processes.

In step S301, feature matching ratios of video frames after the ith key frame are calculated.

Specifically, for the 2D video to be converted, the feature matching ratio $R_c^j$ of the jth video frame beginning from the ith key frame may be obtained according to the following formula 1.

$$R_c^j = \frac{R_j}{R} \quad \text{(Formula 1)}$$

In above formula 1, j is a natural number. If the total number of video frames of the 2D video is a determined value N, and the ith key frame is the mth video frame of the 2D video, then j is less than or equal to N-m. $R_j$ is the number of feature points of the jth video frame beginning from the ith key frame, R is the number of feature points of the ith key frame.

In step S302, a video frame of which the feature matching ratio is between $T_1$ and $T_2$ is selected as a candidate key frame.

$T_1$ and $T_2$ are preconfigured thresholds. In general, the value of a calculated feature matching ratio is in the range of 0~1. If the feature matching ratio is close to 1, it means that the two video frames are very similar. If the feature matching ratio is close to 0, it means that the two video frames are almost completely different. Therefore, generally speaking, the $R_c^j$ will become smaller accompanying with the increase of the value of j. This shows that the farther the video frame departs from the ith key frame, the more the different features exist between the video frame and the ith key frame, i.e., there are more differences between the video frame and the ith key frame. Values of $T_1$ and $T_2$ are generally set in the range of 0~1, and $T_1<T_2$. For example, value of $T_1$ may be set as 0.6, and value of $T_2$ may be set as 0.9.

Specifically, after the feature matching ratio $R_c^j$ of the jth video frame beginning from the ith key frame is calculated, the feature matching ratio $R_c^j$ is compared with $T_1$ and $T_2$. If $T_1 \leq R_c^j \leq T_2$ that is, $R_c^j$ is between $T_1$ and $T_2$, then the jth video frame beginning from the ith key frame is selected as a candidate key frame.

In fact, when feature matching ratios of video frames after the ith key frame are calculated beginning from the first video frame in an ascending order, values of calculated feature matching ratios are gradually decreased. Therefore, after one feature matching ratio of a video frame is calculated, the feature matching ratio is compared with $T_1$, if the calculated feature matching ratio is less than $T_1$, it means that feature matching ratios of video frames after the video frame will be less than $T_1$. That is to say, feature matching ratios of video frames after the video frame will be out of the range of $T_1$~$T_2$, and the video frames after the video frame will not be selected as candidate key frames. Accordingly, after it is determined that one feature matching ratio is less than $T_1$, feature matching ratios of video frames after the ith key frame to be calculated will not be calculated any longer.

After the candidate key frames of which the feature matching ratios are in the range of $T_1$~$T_2$ are selected, one key frame may be selected from the candidate key frames. The specific method for selecting a key frame from the candidate key frames may include the following processes.

In step S303, a re-projection error of each candidate key frame is calculated.

The re-projection error of each candidate key frame may be obtained according to the following formula 2.

$$R.E = \frac{\sum_n [d(P_k X_k^n, x_k^n)]^2}{Num} \quad \text{(Formula 2)}$$

In above formula 2, R.E is the re-projection error of a candidate key frame, the candidate key frame is the kth video frame in the 2D video. $x_k^n$ denote plane coordinates of the nth feature point in the kth video frame. $X_k^n$ denote 3D spatial coordinates of the nth feature point in the kth video frame. $P_k$ denotes the projection matrix calculated with all feature points in the kth video frame. k is a natural number, Num is the number of feature points in the kth video frame, n is a natural number which is less than or equal to Num. d(•) denotes calculating the difference between elements within its brackets.

Since the step of selecting key frames is performed before converted 3D video is obtained, $X_k^n$ in above formula 2 is unknown. That is to say, above formula 2 is usually used to calculate re-projection errors for model reconstruction when 3D video has been obtained. In the embodiment of the present application, however, since the 3D video has not been obtained, 3D spatial coordinates of feature points in a video frame can not be directly obtained.

Therefore, in the technical solution of the embodiment of the present application, $X_k^n$ is obtained from calculation. Concretely, $X_k^n$ may be obtained according to the following formula 3.

$$X_k^n = (P_k^n)^{-1} x_k^n \quad \text{(Formula 3)}$$

$(P_k^n)^{-1}$ is the inverse matrix of the projection matrix $P_k^n$, and $P_k^n$ is calculated according to the following formula 4.

$$P_k^n = \text{Tsai}(x_k^n) \quad \text{(Formula 4)}$$

Tsai(•) in above mentioned formula 4 denotes estimating the projection matrix of the plane coordinates within its brackets.

$P_k$ in above mentioned formula 2 may be calculated according to the following formula 5.

$$P_k = \text{Tsai}(x_k^1, x_k^2, x_k^3, \ldots, x_k^{Num-1}, x_k^{Num}) \quad \text{(Formula 5)}$$

In formula 5, Tsai(•) denotes estimating the projection matrix of the plane coordinates within its brackets.

In step S304, one video frame is selected from the candidate key frames as the (i+1)th key frame according to re-projection errors of the candidate key frames.

In general, the smaller the re-projection error of the video frame is, the more representative the video frame is. Preferably, it is possible to select the candidate key frame with the smallest re-projection error as the (i+1)th key frame. Of course, some other factors may be considered to select the (i+1)th key frame from the candidate key frames.

Figure 4:
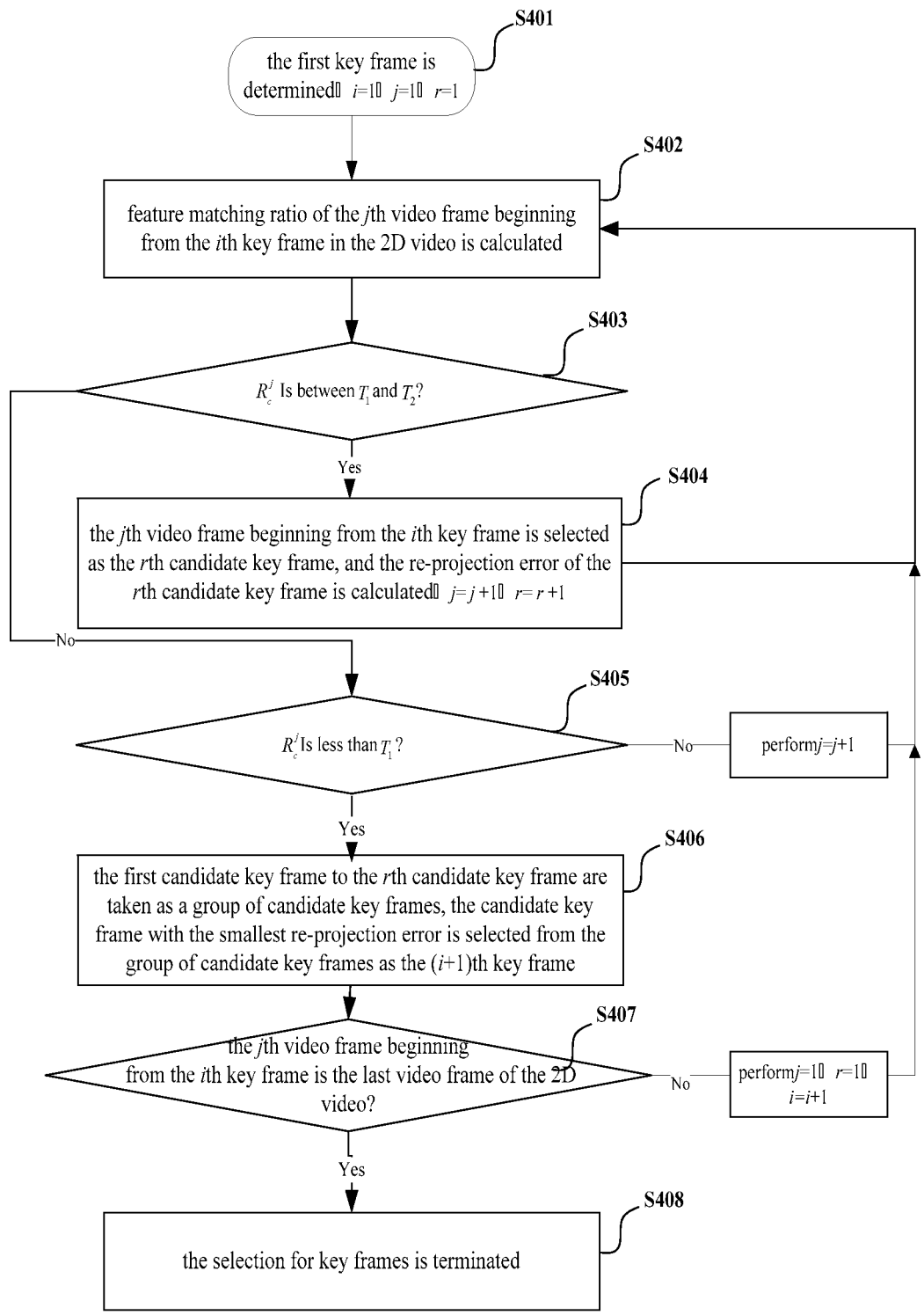
FIG. 4 is a flowchart illustrating a method for selecting key frames from a 2D video according to an embodiment of the present application.

Based on above mentioned principle, in practical application, the specific method for selecting key frames from a 2D video may refer to FIG. 4, which includes the following processes.

In step S401, the first key frame is determined; i=1; j=1; r=1.

The first key frame may be a video frame artificially selected from the 2D video, or be the first video frame automatically selected from the 2D video.

In step S402, feature matching ratio $R_c^j$ of the jth video frame beginning from the ith key frame in the 2D video is calculated.

In step S403, it is determined whether $R_c^j$ is between $T_1$ and $T_2$, if $R_c^j$ is between $T_1$ and $T_2$, proceed to step S404; otherwise, proceed to step S405.

In step S404, the jth video frame beginning from the ith key frame is selected as the rth candidate key frame, and the re-projection error of the rth candidate key frame is calculated; j=j+1, r=r+1; return to S402.

In step S405, it is determined whether $R_c^j$ is less than $T_1$, if $R_c^j$ is less than $T_1$, proceed to step S406; otherwise, after j=j+1 is performed, return to step S402.

In step S406, the first candidate key frame to the rth candidate key frame are taken as a group of candidate key frames, the candidate key frame with the smallest re-projection error is selected from the group of candidate key frames as the (i+1)th key frame.

In step S407, it is determined whether the jth video frame beginning from the ith key frame is the last video frame of the 2D video. If the jth video frame beginning from the ith key frame is the last video frame of the 2D video, proceed to step S408; otherwise, after j=1, r=1, i=i+1 is performed, return to step S402.

In step S408, the selection for key frames is terminated.

In fact, configured values of $T_1$ and $T_2$ may affect the selection for key frames, and then may affect the quality of converted 3D video and workload in the process of 3D video conversion. In other words, it is possible to configure $T_1$ and $T_2$ according to the quality requirement of 3D video into which the 2D video is converted.

Figure 5:
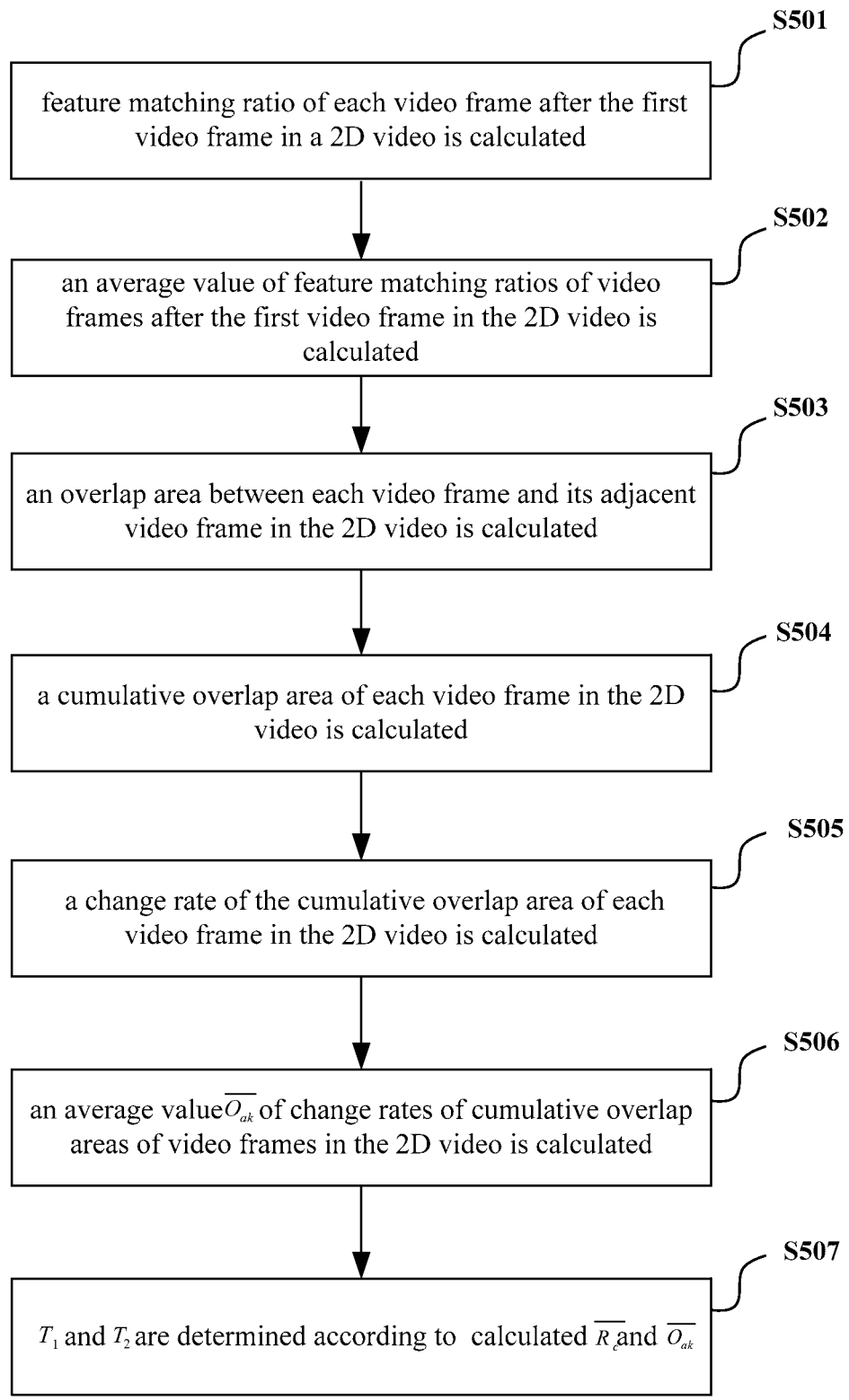
FIG. 5 is a flowchart illustrating a method for configuring feature matching ratio thresholds $T_1$ and $T_2$ according to an embodiment of the present application.

FIG. 5 is a flowchart illustrating a method for configuring feature matching ratio thresholds $T_1$ and $T_2$ according to the quality of the 3D video. The method may be applied to a scenario in which an offline 2D video is converted into a 3D video. That is to say, because each video frame of the offline 2D video is known, it is possible to configure $T_1$ and $T_2$ using the following method, which includes the following processes.

In step S501, for a 2D video, feature matching ratio of each video frame after the first video frame therein is calculated.

Specifically, feature matching ratio $R_c^g$ of the gth video frame in the 2D video is determined according to the following formula 6.

$$R_c^g = \frac{R_g}{R_1} \quad \text{(Formula 6)}$$

In above formula 6, $R_g$ denotes the number of feature points of the gth video frame in the 2D video, $R_1$ denotes the number of feature points of the first video frame in the 2D video.

In step S502, an average value of feature matching ratios of video frames after the first video frame in the 2D video is calculated.

Specifically, the average value $\overline{R_c}$ of feature matching ratios of video frames after the first video frame is determined according to the following formula 7.

$$\overline{R_c} = \frac{\sum_g R_c^g}{Num - 1} \quad \text{(Formula 7)}$$

In above formula 7, g is a natural number in [2, Num], Num is the total number of video frames in the 2D video.

In step S503, an overlap area between each video frame and its adjacent video frame in the 2D video is calculated.

For example, the overlap area between the gth video frame and the (g−1)th video frame in the 2D video is $O_c(g)$.

In step S504, a cumulative overlap area of each video frame in the 2D video is calculated.

For instance, the cumulative overlap area $O_a(g)$ of the gth video frame in the 2D video may be calculated according to the following formula 8.

$$O_a(g) = \sum_{i=1}^{g} O_c(i) \quad \text{(Formula 8)}$$

In step S505, a change rate (or slope) of the cumulative overlap area of each video frame in the 2D video is calculated.

According to the cumulative overlap areas of the first video frame to the Numth video frame, it is possible to draw a cumulative occluded area curve. The slope of cumulative overlap area corresponding to the gth video frame is the change rate of cumulative overlap area of the gth video frame.

In step S506, an average value $\overline{O_{ak}}$ of change rates of cumulative overlap areas of video frames in the 2D video is calculated.

Specifically, after the average value of change rates of cumulative overlap areas of video frames in the 2D video is calculated, $\overline{O_{ak}}$ is obtained.

In step S507, $T_1$ and $T_2$ are determined according to above calculated $\overline{R_c}$ and $\overline{O_{ak}}$.

Specifically, it is possible to determine $T_1$ according to the following formula 9.

$$T_1 = \overline{R_c} \times (a \times \overline{O_{ak}} + b) \quad \text{(Formula 9)}$$

In formula 9, a and b are preset parameters, and one skilled in the art may set the values for a and b according to experiences.

It is possible to determine $T_2$ according to the following formula 10.

$$T_2 = \overline{R_c} \times (c \times \overline{O_{ak}} - d) \quad \text{(Formula 10)}$$

In formula 10, c and d are preset parameters, and one skilled in the art may set the values for c and d according to experiences.

For example, in formula 9, it is possible to set a=0.5, b=0.3; in formula 10, it is possible to set c=0.5, d=0.2.

Obviously, there are no strict sequence for calculating $\overline{R_c}$ and $\overline{O_{ak}}$. $T_1$ and $T_2$ are set according to the average value $\overline{R_c}$ of feature matching ratios and the average value $\overline{O_{ak}}$ of change rates of cumulative overlap areas, and subsequently key frames are selected according to the $T_1$ and $T_2$. Thus the selection of the key frames takes consideration of feature matching ratio and the change rate of cumulative overlap area. When a video frame with a proper feature matching ratio is selected as a key frame, the difference between the key frame and a non-key frame may be lowered, and subsequently the error is small when the key frame is depth transmitted to the non-key frame. In addition, it is possible to select a key frame from the area with a bigger change rate of cumulative overlap area, thus more key frames may be selected from the area where variation of the video frame images is great, and total depth transmission error is further decreased.

Figure 6:
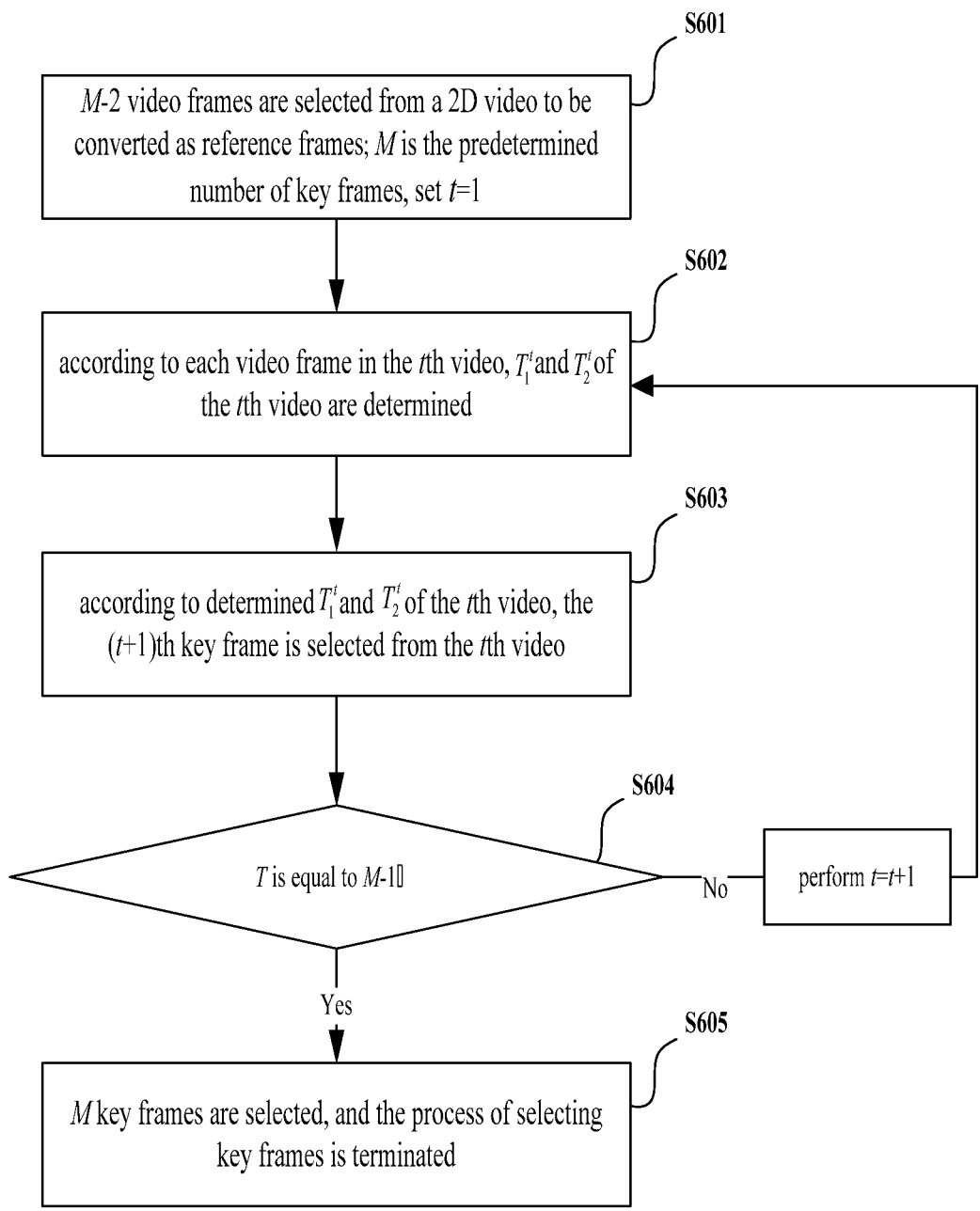
FIG. 6 is a flowchart illustrating a method for determining key frames according to a determined key frame number according to an embodiment of the present application.

In the process of converting the offline 2D video, it is possible to predetermine the number of key frames, and then determine key frames according to predetermined number of key frames. Thus, it is possible to control the quality of converted 3D video in advance and the workload in the 3D conversion. In general, the more the key frames are, the better the quality of converted 3D video is, and the bigger the workload in the 3D conversion is. The specific method for determining key frames according to a predetermined key frame number is shown in FIG. 6, including the following processes.

In step S601, M−2 video frames are selected from a 2D video to be converted as reference frames. Wherein, M is the predetermined number of key frames. Set t=1.

Preferably, the M−2 reference frames are video frames evenly distributed in the 2D video to be converted. For example, the $$\left(\frac{Num}{M-1} \times j\right)th$$

video frame is selected as the jth reference frame. Wherein, Num is the total number of video frames in the 2D video to be converted, j is a natural number which is less than or equal to M−2.

Subsequently, the first video frame or other selected video frame in the 2D video to be converted is taken as the first key frame.

In step S602, according to each video frame in the tth video segment, $T_1^t$ and $T_2^t$ of the tth video segment are determined.

The tth video segment refers to a video segment between the tth key frame and the tth reference frame. The video segment may include the tth reference frame.

If t=1, the tth key frame is the first key frame which is the first video frame or other selected video frame in the 2D video to be converted.

The method for determining $T_1^t$ and $T_2^t$ according to video frames in the tth video segment is similar to that described in above steps S501 to S507. Specifically, it is possible to determine $T_1^t$ according to the following formula 11.

$$T_1^t = \overline{R_c^t} \times (a \times \overline{O_k^t} + b) \quad \text{(Formula 11)}$$

In formula 11, a and b are preset parameters, and one skilled in the art may set the values for a and b according to experience.

$T_2^t$ may be determined according to the following formula 12.

$$T_2^t = \overline{R_c^t} \times (c \times \overline{O_{ak}^t} - d) \quad \text{(Formula 12)}$$

In formula 12, c and d are preset parameters, and one skilled in the art may set the values for c and d according to experiences.

In above formulas 11 and 12, $\overline{R_c^t}$ is the average value of feature matching ratios of video frames after the first video frame in the tth video segment, $\overline{O_{ak}^t}$ is the average value of change rates of cumulative overlap areas of video frames in the tth video segment.

In step S603, according to determined $T_1^t$ and $T_2^t$ of the tth video segment, the (t+1)th key frame is selected from the tth video.

The method for selecting the (t+1)th key frame from the tth video segment according to the $T_1^t$ and $T_2^t$ of the tth video segment is similar to that in above steps S301 to S304. Specifically, the first video frame in the tth video segment is the tth key frame which is equivalent to the ith key frame in above steps S301 to S304. $T_1^t$ and $T_2^t$ of the tth video segment are equivalent to $T_1$ and $T_2$ in above steps S301 to S304. The (i+1)th key frame selected according to the method in above mentioned steps S301 to S304 is equivalent to the (t+1)th key frame selected from the tth video segment. That is to say, after the tth key frame is taken as the ith key frame, and the $T_1^t$ and $T_2^t$ of the tth video segment are taken as the $T_1$ and $T_2$ respectively, steps S301 to S304 are performed. After the (i+1)th key frame is determined, the (i+1)th key frame is taken as the (t+1)th key frame.

In step S604, it is determined that whether t is equal to M−1. If t is equal to M−1, proceed to step S605; otherwise, it means that t is less than M−1, after t=t+1 is performed, return to step S602 to select the (i+1)th key frame.

In step S605, M key frames are selected, and the process of selecting key frames is terminated.

Now M key frames are selected from the 2D video to be converted and the process of selecting key frames is terminated. That is to say, after it is determined that t is less than M−1, the following process is repeatedly performed until it is determined that t is equal to M−1. Performing t=t+1; calculating $T_1^t$ and $T_2^t$ of the tth video segment according to each video frame in the tth video segment; selecting the (t+1)th key frame according to each video frame in the tth video segment.

When an online 2D video is converted into a 3D video, because it is impossible to obtain all video frames of the online 2D video, $\overline{R_c}$ cannot be calculated by adopting the method in above steps S501 to S502, and $\overline{O_{ak}}$ cannot be calculated by adopting the method in above steps S503 to S506. Therefore, for the online 2D video, $\overline{R_c}$ and $\overline{O_{ak}}$ may be determined according to the quality requirement of the 3D video into which the online 2D video is converted. Generally speaking, $\overline{R_c}$ and $\overline{O_{ak}}$ also reflect the quality of the 3D video. In other words, when an online 2D video is converted into a 3D video, $\overline{R_c}$ and $\overline{O_{ak}}$ are predetermined. Consequently, it is possible to calculate $T_1$ and $T_2$ according to predetermined $\overline{R_c}$ and $\overline{O_{ak}}$, the method for calculating $T_1$ and $T_2$ is same as above step S507, and detailed descriptions are omitted herein for clarity.

After $T_1$ and $T_2$ are determined, for the online conversion of 2D video to 3D video, it is possible to select key frames while making the 2D video. The key frame selection method is the same as that in above steps S201 to S204. Since the key frames are selected in the process of making the 2D video, before the process of making the 2D video is terminated, the result of determining whether the end of the 2D video is arrived in step S203 should be "no". Namely, before the process of making the 2D video is terminated, the steps S201 to S204 are repeatedly performed. Until the process of making the 2D video is terminated, and it is determined that the end of the 2D video is arrived, the step S205 is performed to terminate the selection of key frames.

Figure 7:
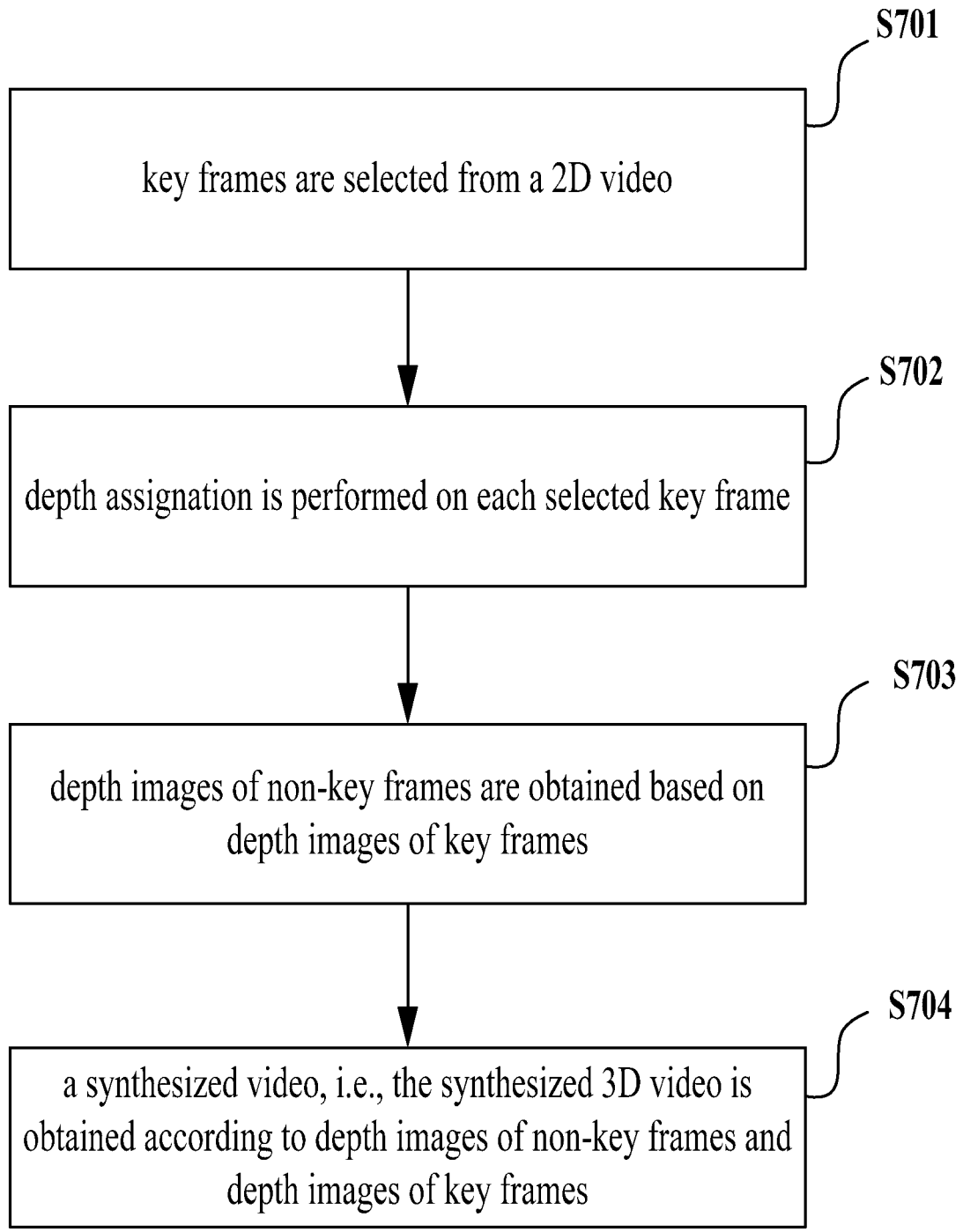
FIG. 7 is a flowchart illustrating a method for 2D to 3D video conversion according to an embodiment of the present application.

In view of above mentioned key frame selection methods, the method for converting 2D video to 3D video provided by embodiments of the present application is shown in FIG. 7, which including the following processes.

In step S701, key frames are selected.

Specifically, it is possible to select key frames from the 2D video according to the method in steps S201 to S205, or from the 2D video to be converted according to the method in steps S601 to S605. Since relevant key frame selection methods have been described in detail hereinbefore, detailed descriptions are omitted herein.

In step S702, depth assignation is performed on each selected key frame.

Specifically, it is possible to perform the depth assignation on each key frame by utilizing a depth assignation tool. The process of assignation includes the following processes. First, a key frame image is scrawled to be divided into different parts, wherein each part is assigned a depth. Thus a depth image of the key frame is obtained. Because the depth assignation technique is known by persons skilled in the art, no further descriptions will be provided hereinafter.

In step S703, depth images of non-key frames are obtained based on depth images of key frames.

Specifically, the depth images of non-key frames are obtained based on the depth images of the key frames by using a depth transmission algorithm. Because the technique is known very well by persons skilled in the arts, detailed descriptions are omitted herein.

In step S704, a synthesized video is obtained according to depth images of non-key frames and depth images of key frames, namely, a synthesized 3D video is obtained.

Because the 3D video synthesizing method is known very well by persons skilled in the art, detailed descriptions are omitted herein.

Figure 8A:
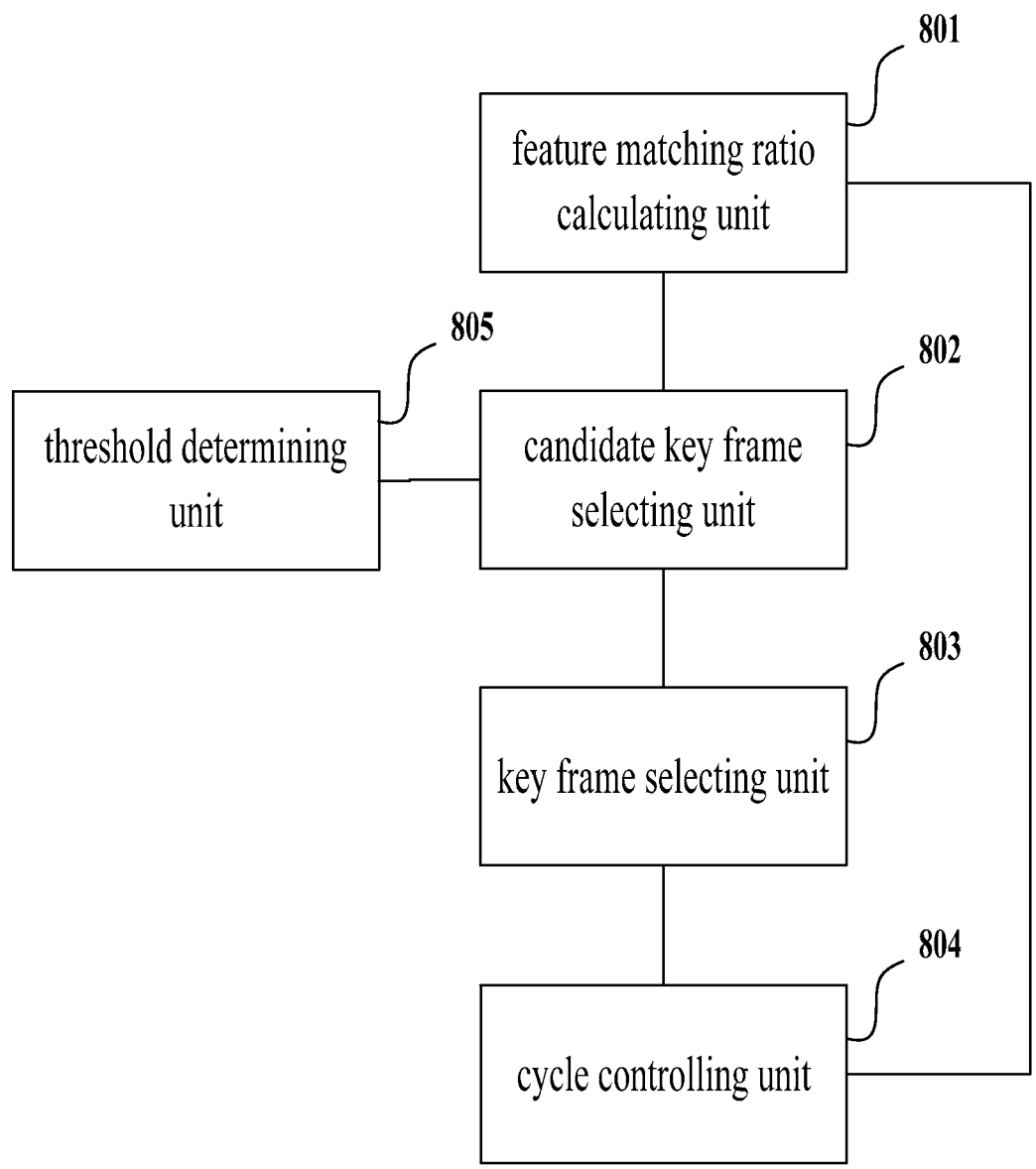
FIG. 8a and FIG. 8b are schematic diagrams respectively illustrating an key frame selection apparatus according to an embodiment of the present application.

A structure of a key frame selection apparatus in 3D video conversion system provided by an embodiment of the present application is shown in FIG. 8a, the apparatus includes a feature matching ratio calculating unit 801, a candidate key frame selecting unit 802 and a key frame selecting unit 803.

The feature matching ratio calculating unit 801 is configured to calculate feature matching ratios of video frames after the ith key frame in a 2D video according to the ith key frame. Wherein, is a natural number, the feature matching ratio $R_c^j$ of the jth video frame beginning from the ith key frame is obtained according to above mentioned formula 1. When i=1, the feature matching ratio calculating unit 801 takes the first video frame in the 2D video as the first key frame.

The candidate key frame selecting unit 802 is configured to, according to feature matching ratios calculated by the feature matching ratio calculating unit 801, select video frames each of which has a feature matching ratio within the range of $T_1$~$T_2$ as candidate key frames. Values of $T_1$ and $T_2$ are preset, and $T_1 < T_2$.

The key frame selecting unit 803 is configured to select one video frame from the candidate key frames selected by the candidate key frame selecting unit 802 as the key frame. Specifically, the key frame selecting unit 803 calculates a re-projection error of each candidate key frame selected by the candidate key frame selecting unit 802, and select one video frame from the candidate key frames as the (i+1)th key frame. Concretely, the key frame selecting unit 803 selects a candidate key frame with the smallest re-projection error as the (i+1)th key frame.

Furthermore, the key frame selection apparatus may also include a cycle controlling unit 804.

After the key frame selecting unit 803 selects out the (i+1)th key frame, if determining that the end of the 2D video is not arrived, the cycle controlling unit 804 updates i=i+1, and sends updated value of i to the feature matching ratio calculating unit 801. After receiving the updated value of i sent by the cycle controlling unit 804, the feature matching ratio calculating unit 801 continues to calculate feature matching ratios of video frames after the ith key frame in a 2D video according to the ith key frame. Subsequently, the candidate key frame selecting unit 802 continues to select candidate key frames according to feature matching ratios calculated by the feature matching ratio calculating unit 801; the key frame selecting unit 803 continues to select the (i+1)th key frame according to candidate key frames selected by the candidate key frame selecting unit 802.

Above mentioned key frame selecting unit may includes the following sub-units.

A re-projection error calculating sub-unit, configured to calculate a re-projection error of each candidate key frame. The re-projection error R.E of each candidate key frame may be obtained according to the above mentioned formula 2.

A key frame determining sub-unit, configured to select one candidate key frame with the smallest re-projection error as the (i+1)th key frame according to calculated results of the re-projection error calculating sub-unit.

Furthermore, the key frame selection apparatus may also include a threshold determining unit 805.

The threshold determining unit 805 is configured to determine $T_1$ and $T_2$. Specifically, $T_1$ may be determined according to above mentioned formula 9, and $T_2$ may be determined according to above mentioned formula 10.

Figure 8B:
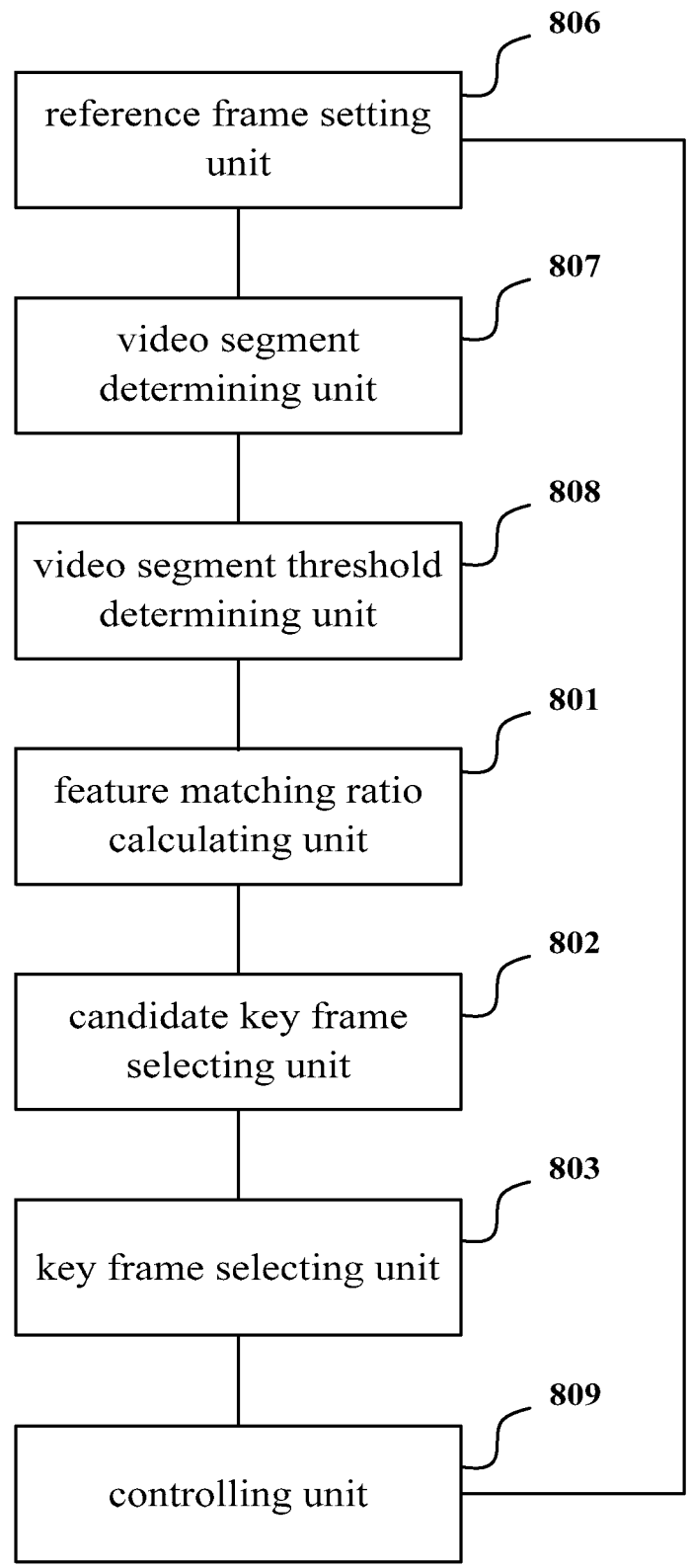

A structure of another key frame selection apparatus provided by an embodiment of the present application is shown in FIG. 8b. The apparatus includes a reference frame setting unit 806, a video segment determining unit 807, a video segment threshold determining unit 808, a controlling unit 809 as well as the above mentioned feature matching ratio calculating unit 801, candidate key frame selecting unit 802 and key frame selecting unit 803.

The reference frame setting unit 806 is configured to select M−2 video frames from a 2D video to be converted as reference frames; wherein, M is a predetermined number of key frames; set t=1, and determine the first video frame in the 2D video to be converted as the first key frame in the 2D video to be converted. Preferably, the M−2 reference frames are video frames evenly distributed in the 2D video to be converted.

The video segment determining unit 807 is configured to take the video segment between the tth key frame and the tth reference frame as the tth video.

The video segment threshold determining unit 808 is configured to calculate $T_1^t$ and $T_2^t$ of the tth video segment according to every video frame in the tth video segment, take $T_1^t$ and $T_2^t$ as $T_1$ and $T_2$ respectively, take the tth key frame as the ith key frame, and send $T_1$, $T_2$ and the ith key frame to the feature matching ratio calculating unit 801. The specifically method for the video segment threshold determining unit 808 to determine the $T_1^t$ and $T_2^t$ of the tth video segment has been described in detail in above mentioned step S602, no further descriptions will be provided hereinafter.

After receiving the ith key frame, $T_1$ and $T_2$ sent by the video segment threshold determining unit 808, the feature matching ratio calculating unit 801 calculates feature matching ratios of video frames after the ith key frame in a 2D video according to the ith key frame.

The candidate key frame selecting unit 802 and the key frame selecting unit 803 are the same as that described above. No further descriptions will be provided hereinafter.

After obtaining the (i+1)th key frame selected by the key frame selecting unit 803, the controlling unit 809 takes the (i+1)th key frame as the (t+1)th key frame. After determining that t is less than M−1, the controlling unit 809 updates t=t+1, and sends the (t+1)th key frame and updated value of t to the video segment determining unit 807. The video segment determining unit 807 re-determines a video segment according to the updated value of t sent by the controlling unit 809.

Figure 9:
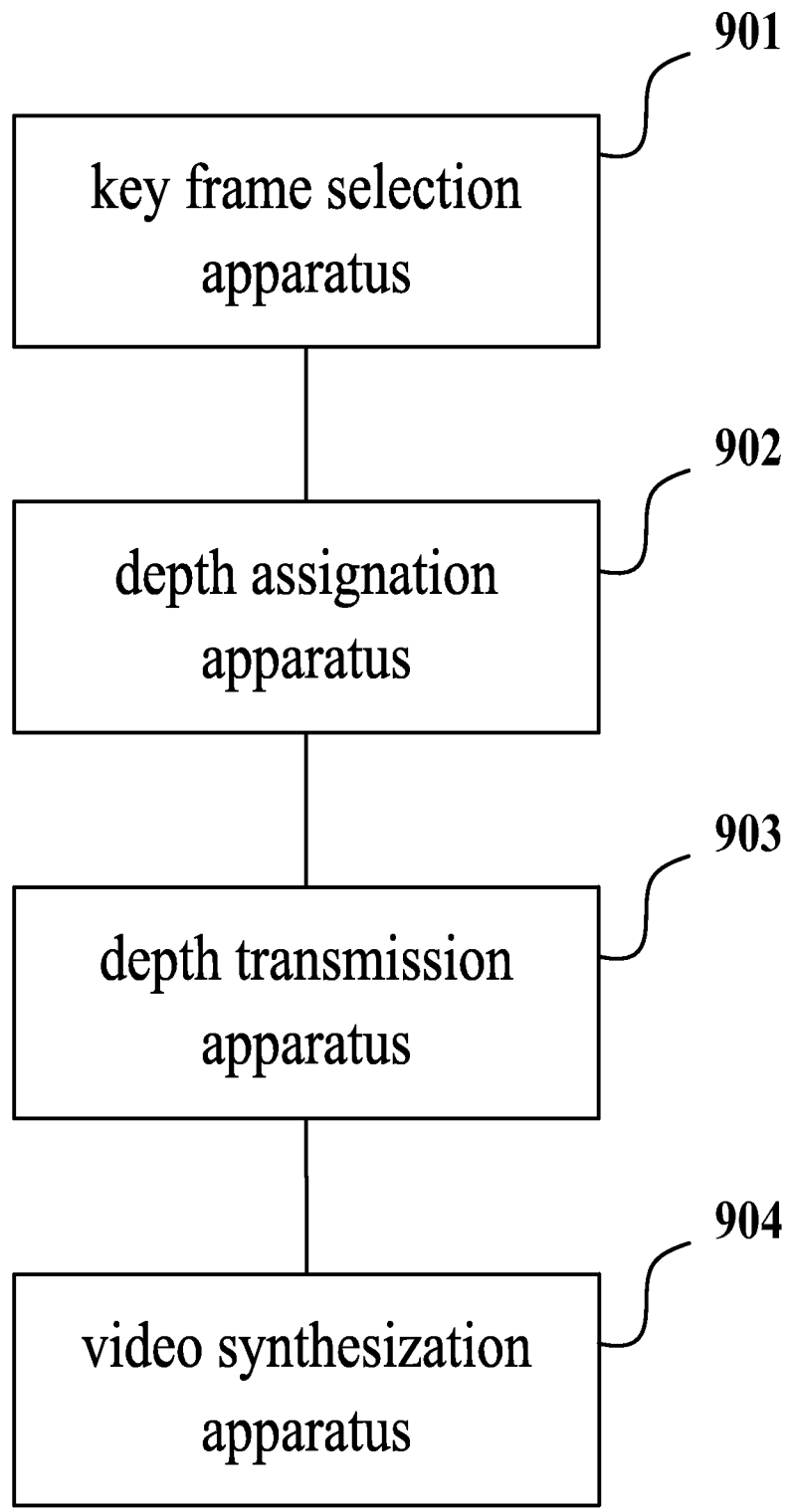
FIG. 9 is a schematic diagram illustrating a system for 2D to 3D video conversion according to an embodiment of the present application.

A 2D video to 3D video conversion system provided by an embodiment of the present application is shown in FIG. 9, the system includes a key frame selection apparatus 901, a depth assignation apparatus 902, a depth transmission apparatus 903 and a video synthesizing apparatus 904.

The key frame selection apparatus 901 is configured to select key frames. The structure of the key frame selection apparatus 901 is the same as the structure of key frame selection apparatus shown in FIGS. 8a and 8b. No further descriptions will be provided hereinafter.

The depth assignation apparatus 902 is configured to perform depth assignation on each key frame selected by the key frame selection apparatus 901, and obtain a depth image of each key frame.

The depth transmission apparatus 903 is configured to obtain depth images of non-key frames based on depth images of key frames.

The video synthesizing apparatus 904 is configured to synthesize a 3D video according to the depth images of key frames and the depth images of non-key frames.

In the embodiments of the present application, since candidate key frames are selected according to the feature matching ratios of video frames to the previous key frame, and the later key frame is selected according to the re-projection errors of the candidate key frames, the selection for key frames is more reasonable, and the 2D to 3D video conversion based on more reasonable key frames may improve converted 3D video quality.

Furthermore, the embodiments of the present application also provide a scheme for adjusting the feature matching ratio thresholds $T_1$ and $T_2$, thus it is possible to determine $T_1$ and $T_2$, and then determine key frames according to 3D video quality requirement. Consequently, a more flexible 3D video conversion method is provided, a technician can flexibly adjust $T_1$ and $T_2$ according to 3D video quality requirement.

In addition, embodiments of the present application also provide a scheme for determining key frames according to a predetermined key frame number, which provides more flexibility for a technician to perform the 3D video conversion. Before converting a 3D video, the technician may limit the number of key frames according to the workload in advance. The key frame selection method may guarantee that the final number of selected key frames conforms to the predetermined key frame number, and ensure the workload of the technician.

Persons skilled in the art may understand that it is possible to implement all of or part of above steps in methods provided by embodiments of the present application with relative hardwires being instructed by a program, and the program may be stored in a computer readable storage medium, such as ROM/RAM, diskette and compact disk.

The foregoing description is only preferred embodiments of the present application and is not used for limiting the protection scope thereof. Any modification, equivalent substitution, or improvement made without departing from the spirit and principle of the present application should be covered by the protection scope of the present application.

What is claimed is:

1. A key frame selection method for 3D video conversion, comprising, for a 2D video having an identified ith key video frame, i being a natural number:

obtaining, by a computer device, a number of features points in the ith key video frame as a reference feature point number R;

for each of a plurality of video frames of the 2D video after the ith key video frame:

determining, by a computer device, a number of feature points in the video frame as a contrastive feature point number $R_j$;

calculating, by a computer device, a matching ratio $R_c^j$ between the contrastive feature point number and the reference feature point number;

selecting, by a computer device, at least one video frame from the plurality of video frames that is associated with a matching ratio within a preconfigured threshold value range $[T_1, T_2]$ as an (i-1)th video key frame of the 2D video; and synthesizing, by a computer device, a 3D video from the 2D video using the selected at least one key video frame as references.

2. The method according to claim 1, wherein the selecting of the (i-1)th key video frame further comprises:

selecting a group of video frames from the plurality of video frames as a croup of candidate key video frames, each of the croup of candidate key video frames associated with a matching ratio within the preconfigured threshold value;

determining a re-projection error R.E for each of the group of candidate key video frames; and selecting a video frame from the group of candidate key video frames that has a minimum re-projection error as the (i+1)th key frame of the 2D video.

3. The method according to claim 2, wherein the re-projection error R.E of a candidate key frame in the croup of candidate key video frame is calculated according to a formula $$R.E = \frac{\sum_n d(P_k X_k^n, x_k^n)^2}{Num},$$

wherein the candidate key video frame is a kth video frame in the 2D video, $x_n^k$ is plane coordinates of an nth feature point in the kth video frame, $X_k^n$ is 3D spatial coordinates of the nth feature point in the kth video frame, $P_k$ is a projection matrix calculated with all feature points in the kth video frame, k is a natural number, Num is the number of feature points in the kth video frame, n is a natural number which is less than or equal to Num;

$X_k^n$ is calculated according to a formula $$X_k^n = (P_k^n)^{-1} x_k^n,$$

wherein $(P_k^n)^{-1}$ is an inverse matrix of the projection matrix $P_k^n$, and $P_k^n$ is calculated according a formula $$P_k^n = \text{Tsai}(x_k^1, x_k^2, x_k^3, \ldots x_k^{Num-1}, x_k^{Num}),$$

wherein Tsai(•) denotes estimating the projection matrix of the plane coordinates within its brackets.

4. The method according to claim 2, wherein $T_1$ is calculated according to a formula $$T_1 = \overline{R_c} \times (a \times \overline{O_{ak}} + b),$$

wherein a and b are preset parameters, $\overline{R_c}$ is an average value of feature matching ratios of video frames after a first video frame in the 2D video, and $\overline{O_{ak}}$ is an average value of change rates of cumulative overlap areas of video frames in the 2D video; and $T_2$ is calculated according to a formula $$T_2 = \overline{R_c} \times (c \times \overline{O_{ak}} - d),$$

wherein c and d are preset parameters.

5. The method according to claim 4, wherein $\overline{R_c}$ is calculated according to a formula $$\overline{R_c} = \frac{\sum_g R_c^g}{\text{Total\_Num} - 1}$$

wherein Total_Num is a total number of video frames in the 2D video, $R_c^g$ is the feature matching ratio of a gth video frame in the 2D video, $R_c^g$ is calculated according to a formula $$R_c^g = \frac{R_g}{R_1}$$

wherein $R_g$ is the number of feature points of the gth video frame in the 2D video, $R_1$ is the number of feature points of the first video frame in the 2D video; wherein, g is a natural number from 2 to Total_Num.

6. The method according to claim 5, further comprising determining cumulative overlap areas for video frames of the 2D video, wherein the cumulative overlap area between the gth video frame and a (g−1)th video frame is $$O_a(g) = \sum_{i=1}^{g} O_c(i),$$

wherein $O_c(i)$ is an overlap area of the gth video frame and a (g+1)th video frame in the 2D video and g is a natural number from 2 to Total Num.

7. The method according to claim 1, wherein the calculating of the feature matching ratio $R_c^j$ of the plurality of video frames after the ith key video frame comprises:
beginning from a first video frame after the ith key video frame, continue calculating the feature matching ratio of each video frame after the ith key video frame of the 2D video in an ascending order until a video frame of which the feature matching ratio is less than $T_1$.

8. The method according to claim 1, further comprising: determining a first video frame as a first key video frame.

9. The method according to claim 1, further comprising, before determining the (i+1)th key video frame based on the ith key frame:
selecting M−2 video frames from the 2D video as reference frames; wherein M is a predetermined number of key video frames;
determining a first video frame in the 2D video as the first key frame;
for a tth video segment:
calculating $T_1^t$ and $T_2^t$ of the tth video segment wherein the tth video segment is a video segment between a tth key video frame and a tth reference frame, t is a natural number;
taking the tth key video frame as the ith key video frame, and taking the $T_1^t$ and $T_2^t$ of the tth video segment as the $T_1$ and $T_1$ respectively; and
after determining an (i−1)th key video frame based on the ith key video frame, the method further comprising: taking the (i+1)th key video frame as the (t+1)th key video frame.

10. The method according to claim 9, wherein calculating $T_1^t$ and $T_2^t$ of the tth video segment comprises:
determining $T_1^t$ according a formula $$T_1^t = \overline{R_c^t} \times (a \times \overline{O'_{ak}} + b)$$

wherein a and b are preset parameters, $\overline{R_c^t}$ is the average value of feature matching ratios of video frames after the first video frame in the tth video segment, $\overline{O'_{ak}}$ is the average value of change rates of cumulative overlap areas of video frames in the tth video segment;
determining $T_2^t$ according to a formula $$T_2^t = \overline{R_c^t} \times (c \times \overline{O'_{ak}} + d)$$

wherein c and d are preset parameters.

11. The method according to claim 1, wherein the synthesizing of the 3D video comprising:
performing depth assignation on each of the selected at least one key video frames;
obtaining depth images of non-key frames according to depth images of the selected at least one key video frames;
synthesizing a 3D video according to the depth images of the non-key frames and depth images of the at least one key video frames.

12. An apparatus comprising at least one computer device, wherein the at least one computer device includes a program installed therein, when executing the program, the at least one computer device is directed to:
identify an ith key video frame of a 2D video;
obtain a number of features points in the ith key video frame as a reference feature point number R;
for each of a plurality of video frames of the 2D video after the ith key video frame:
determine a number of feature points in the video frame as a contrastive feature point number $R_j$;
calculate a matching ratio $R_c^j$ between the contrastive feature point number and the reference feature point number;
select at least one video frame from the plurality of video frames that is associated with a matching ratio within a preconfigured threshold value range [$T_1$, $T_2$] as an (i−1)th key video frame of the 2D video; and
synthesize a 3D video from the 2D video using the selected at least one key video frame as references.

13. The apparatus according to claim 12, wherein to select the (i−1)th key video frame, the at least one computer device is further directed to:
select a group of video frames from the plurality of video frames as a group of candidate key video frames, each of the group of candidate key video frames associated with a matching ratio within the preconfigured threshold value;
determine a re-projection error R.E for each of the group of candidate key video frames; and
select a video frame from the group of candidate key video frames that has a minimum re-projection error as the (i−1)th key frame of the 2D video.

14. The apparatus according to claim 12, wherein the re-projection error R.E of a candidate key frame in the group of candidate key video frame is calculated according to a formula $$R.E = \frac{\sum_n d(P_k X_k^n, x_k^n)^2}{Num}$$

wherein the candidate key frame is a kth video frame in the 2D video, $x_k^n$ is plane coordinates of the nth feature point in the kth video frame, $X_k^n$ is 3D spatial coordinates of the nth feature point in the kth video frame, $P_k$ is the projection matrix calculated with all feature points in the kth video frame, k is a natural number, Num is the number of feature points in the kth video frame, n is a natural number which is less than or equal to Num; d(•) denotes calculating the difference between elements within its brackets;

$X_k^n$ is calculated according to a formula $$X_k^n = (P_k^n)^{-1} x_k^n$$

$(P_k^n)^{-1}$ is an inverse matrix of the projection matrix $P_k^n$, and $P_k^n$ is calculated according to a formula $$P_k^n = \text{Tsai}(x_k^1, x_k^2, x_k^3, \ldots x_k^{Num-1}, x_k^{Num})$$

wherein Tsai(•) denotes estimating the projection matrix of the plane coordinates within its brackets.

15. The apparatus according to claim 12, wherein the at least one computer device is further directed to determine $T_1$ and $T_2$ according to the following formulas $$T_1 = \overline{R_c} \times (a \times \overline{O_{ak}} + b), \text{ and}$$

$$T_2 = \overline{R_c} \times (c \times \overline{O_{ak}} - d)$$

wherein a, b, c, and d are preset parameters, $\overline{R_c}$ is an average value of feature matching ratios of video frames after the first video frame in the 2D video, and $\overline{O_{ak}}$ is an average value of change rates of cumulative overlap areas of video frames in the 2D video, wherein $\overline{R_c}$ is calculated according to a formula $$\overline{R_c} = \frac{\sum_g R_c^g}{\text{Total\_Num} - 1}$$

wherein Total Num is a total number of video frames in the 2D video, $R_c^g$ is the feature matching ratio of a gth video frame in the 2D video, $R_c^g$ is calculated according to a formula $$R_c^g = \frac{R_g}{R_1}$$

in the formula 6, $R_g$ is the number of feature points of the gth video frame in the 2D video, $R_1$ is the number of feature points of the first video frame in the 2D video; wherein, g is a natural number from 2 to Total Num.

16. The apparatus according to claim 12, wherein the at least one computer device is further directed to
take a first video frame in the 2D video as a first key video frame;
update i=i+1 after selecting out an (i+1)th key video frame,
calculate feature matching ratios of video frames after an ith key video frame in a 2D video according to the ith key video frame after receiving the updated value of i.

17. The apparatus according to claim 12, wherein the at least one computer device is further directed to:
select M−2 video frames from the 2D video as reference frames, wherein M is a predetermined number of key frames; and
determine a first video frame in the 2D video as a first key video frame in the 2D video;
take a video segment between a tth key frame and a tth reference frame as a tth video segment, wherein t is a natural number;
calculate $T_1^t$ and $T_2^t$ of the tth video segment according to every video frame in the tth video segment,
take $T_1^t$ and $T_2^t$ as $T_1$ and $T_2$ respectively,
take the tth key frame as the ith key frame, and
send $T_1$, $T_2$ and the ith key frame to the feature matching ratio calculating unit;
after obtaining the (i+1)th key frame selected by the key frame selecting unit, take the (i+1)th key frame as the (t+1)th key frame; and after determining that t is less than M−1, update t=t+1, and sends the (t+1)th key frame and updated value of t to the video segment determining unit.

18. The apparatus according to claim 12, wherein to synthesize the 3D video the at least one of computer device is further directed to:
perform depth assignation on each of the selected at least one key video frames;
obtain depth images of non-key frames according to depth images of the selected at least one key video frames;
synthesize a 3D video according to the depth images of the non-key frames and depth images of the at least one key video frames.

\* \* \* \* \*